June 6, 1933.  E. L. WIEGAND  1,913,298
ELECTRIC LIQUID HEATING APPARATUS
Filed June 7, 1928   2 Sheets-Sheet 1

Edwin L. Wiegand
Inventor
by Smith and Freeman
Attorneys

June 6, 1933.  E. L. WIEGAND  1,913,298
ELECTRIC LIQUID HEATING APPARATUS
Filed June 7, 1928   2 Sheets-Sheet 2

Edwin L. Wiegand
Inventor
by Smith and Freeman
Attorneys

Patented June 6, 1933

1,913,298

UNITED STATES PATENT OFFICE

EDWIN L. WIEGAND, OF PITTSBURGH, PENNSYLVANIA, ASSIGNOR TO EDWIN L. WIEGAND COMPANY, OF PITTSBURGH, PENNSYLVANIA, A CORPORATION OF PENNSYLVANIA

ELECTRIC LIQUID HEATING APPARATUS

Application filed June 7, 1928. Serial No. 283,509.

This invention relates to apparatus for heating liquids electrically and is primarily directed toward coffee percolators although many features of the invention are susceptible of much wider application. Among the objects of the invention are the provision of a new and improved construction and arrangement whereby rapidity of heating is secured; the provision of new and simple means for protecting the apparatus against injury in the presence of an insufficiency of liquid; the provision of a new and improved construction of electric resistance heating element; the provision of new tools and manipulations for the production of such heating element; and, as applied specifically to percolators, the provision of a device of this character which shall exhibit a wide range of capacities, combined with speed at all capacities and protection against burning out; while further objects and advantages of the invention will appear as the description proceeds.

Most users, at least in America, demand speed in the operation of electrical heating equipment, which, in turn, entails low heat capacity in the parts and rapid heat transfer to the thing heated. This, in the case of liquid heaters, results in quick destruction if insufficient liquid be present to absorb and dissipate the heat generated, for which reason I have provided a new and peculiar safety device as well as a special mounting of the heating element to secure rapid heating.

Also, as regards the particular problem of the percolator, most users demand one which will make any number of cups of coffee from two to six; and I have designed a percolator which by reason of the shape and arrangement of the heating surface and convection passageways permits such rapidity of convection as to absorb and dissipate a high rate of energy input at all stages within the limits of its capacity.

Figure 1:
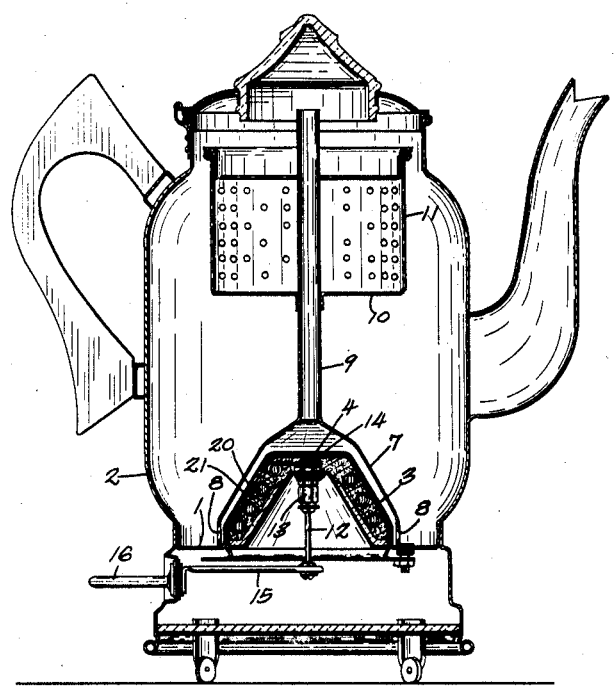
Figure 2:
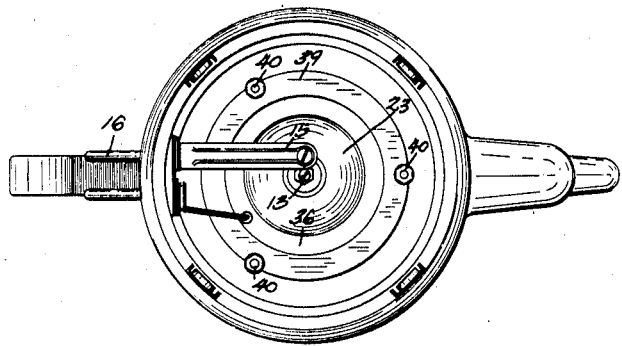
Figure 3:
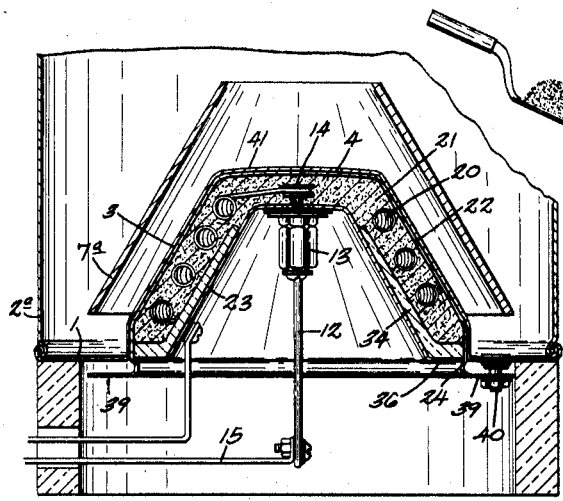
Figure 4:
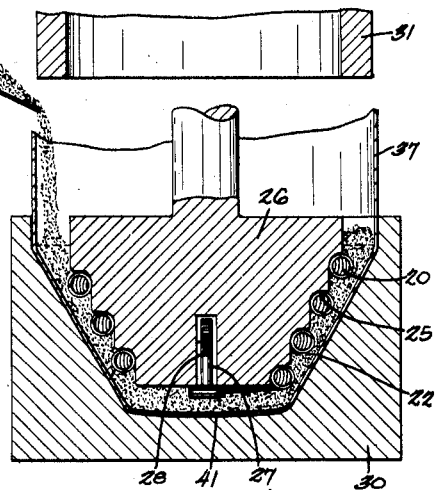
Figure 5:
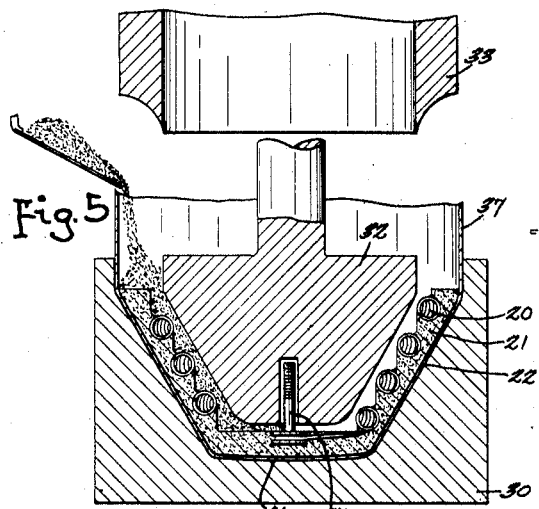
Figure 6:
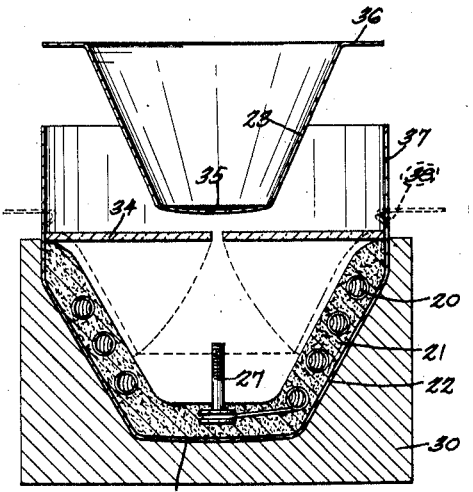
Figure 7:
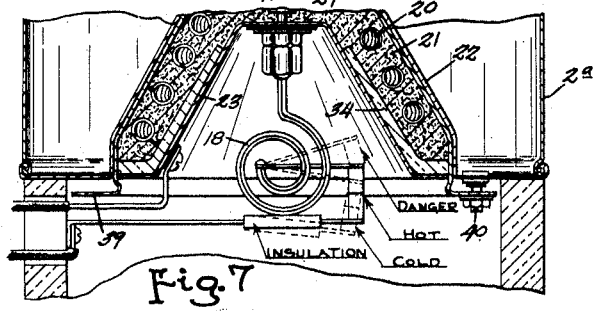

In the drawings accompanying and forming a part of this application Fig. 1 is a vertical sectional view and Fig. 2 a bottom plan view of a coffee percolator containing my improvements; Fig. 3 is an enlarged vertical sectional view of a liquid heater and heating element containing my improvements; Figs. 4, 5, and 6 illustrate successive tools and steps in the manufacture of the particular heating element shown in Figs. 1 to 3 inclusive; and Fig. 7 shows the use of a modified form of heat responsive, safety device.

Whatever be the particular use or purpose of the liquid heater, its liquid holding part is preferably made with a bottom 1 of sheet metal, which may be either integral with the side wall 2 as shown in Fig. 1 or joined thereto as shown at $2^a$ in Fig. 3. A part of this bottom spaced from the side wall is drawn upwardly into a hollow, frustum-shaped boss having slanted side walls 3 and a top 4 which is integral therewith and generally slightly rounded, although this rounding need not be produced initially but may, when present at all, be produced upon assembling or during use. In the case of a percolator the width of the space around this boss is so chosen as to accommodate the minimum amount of liquid for which the apparatus is designed, e. g. two cups.

Tightly clamped into the bottom of this boss is an electric resistance heating unit having an external shape and size complementary to that of the boss; and surrounding said boss at a little distance in the case of a percolator is an inverted funnel 7 having inlet openings 8 around its mouth which rests on the bottom 1, and has a geyser tube 9 rising through the bottom 10 of the perforated coffee receptacle 11. The side wall of the funnel is substantially parallel to that of the boss adjacent thereto defining a narrow annular channel for the circulation of the liquid, although, in the case of a percolator, I preferably provide a slightly enlarged chamber immediately over the apex of the boss for the collection of steam bubbles. It is desirable also to employ a funnel and circulating tube in connection with a plain liquid heater as shown at $7^a$ in Fig. 3 since this tends to reduce eddying and create a faster flow of the liquid past the heated surface; but my improvements are not limited to instances wherein this member is used since the shape of the boss tends to induce smooth convection flow without a shield.

Another advantage of the construction here shown is that a heating element, especially one of the metal sheathed type can be clamped with said boss in such wise as to secure good metal-to-metal contact throughout the entire surface; and as a result of these different features I am able to employ successfully, even in a coffee percolator of the size indicated as much as 600 watts of energy.

This amount of energy, would, of course, in the absence of liquid, ruin the apparatus in a very few minutes and to safeguard the same I preferably employ a thermally responsive element so located as to break the circuit under danger conditions. To this end, I make the heating element hollow and locate the temperature responsive element inside the same. This element, in its simplest form, consists of a fusible rod or wire 12 fastened by a nut 13 to a terminal stud 14 which is mounted in the inner vertex of the unit so as to connect the unit to the fuse both thermally and electrically. The lower end of this fuse is secured to a conductor 15 whose opposite end is attached to one pole 16 of the separable connector with which such a device is generally equipped. The fuse employed is preferably that set forth in my copending application filed May 9, 1928, Serial No. 276,270, consisting of a readily fusible metal, plated externally with an oxidation-resisting metal, like chromium, for example, which shall prevent change of melting point as a result of long exposure to heat. However, any kind of fuse can be employed or other heat-responsive, circuit controlling element such as the bimetallic thermostatic bar 18 shown in Fig. 7. So long as the boss is submerged in liquid the heat abstraction is sufficiently rapid to avoid operation of the heat responsive element, but if the boss becomes uncovered by evaporation the circuit is opened before all the liquid is dissipated. Even if the current be applied with no liquid in the receptacle the safety appliance generally preserves the apparatus from serious injury.

In its preferred form the heating element consists of a coil of resistance wire 20 embedded in a granular compacted electrically insulating material 21 which in turn is more or less completely encased in a sheet-metal sheath. In the present embodiment this sheath is complete and consists of an outer member 22 and an inner member 23 tightly seamed together at 24. One mode of making this device is shown in Figs. 4, 5, and 6.

According to this procedure the wire 20, after having been first coiled helically, is wound spirally about the winding form 26 whose frustate-shaped head is formed with an external volute groove 25 for the reception of such wire, one end of the wire being attached to the head of a terminal bolt 27 whose shank is loosely received in an axial recess 28 of that tool. The wire is then pressed into a layer of granular insulating material suitably provided therefor and held in a recess of proper shape. When the exterior of the element is to be metal sheathed, this recess is defined by the interior of this sheath as shown at 22. The granular material can be introduced in advance, or simultaneously with the wire, or afterward. This material is compacted about the wire by the introduction of a suitable tamping tool 31 into the annular space around the tool 26, and depressing both said tamping tool and said winding tool, both of which are then removed leaving the wire partly submerged as shown at the right hand side of Fig. 5.

More granular material is then introduced and a forming tool 32 of approximately the shape and size of the interior of the finished unit, another tamping tool 33 is applied, and the second layer of such granular material thereby defined is compacted over and around the wire. These tools are then removed, an asbestos gasket 34 laid on the top of the unit, and the previously-formed, inner, sheet-metal, sheath-member is introduced. This member is formed at its apex with a hole 35 for the free passage of the bolt 27 and at its rim with an outturned flange 36 which fits closely inside the wall of the member 22 which has hitherto had a cylindrical skirt 37 but is now upset, folded, and pressed down as shown at 38 to retain the inner member and itself to constitute an outstanding flange 39 adapted to receive the bolts 40 whereby the unit is forcibly seated in the hollow boss. Preferably when the unit is made with a closed apex the same is slightly rounded as indicated at 41 in Figs. 4 to 6, inclusive, so that when it reaches the top of the boss it will make close contact therewith, so that the loss of heat to the liquid may keep the terminal bolt from becoming overheated.

The purpose of the asbestos gasket 34 is also to shield the temperature responsive member from the heat to some degree. It can be originally applied either in the cupped form shown in Fig. 3 or in the disk shape of Fig. 6 in which latter case it is torn and stretched into contact with the granular material.

It will be understood that a great many changes can be made in the different details herein set forth. For example, while I have described a desirable and practical mode of making a heating unit my improved liquid heater is not limited to use with a heater so made. While I have illustrated an asbestos packing inside the sheath of a tapered element it is not limited to that shape of element. While I have shown these elements in connection with liquid heaters they are not limited to such use. While I have here shown a heating element which is covered with a metal sheathing on both sides, one or the other face of the same can be left unsheathed. While I have described a certain process of making such element, other manipulations and tools can be employed. And in general I do not limit myself to any details of design, arrangement, construction, use, or combination except as the same are specifically recited in my several claims which I desire may be construed broadly, each independent of limitations contained in other claims.

Having thus described my invention what I claim is:

1. In a hollow electric resistance heating element having an external contact-heating face and having an interior metal lining, a resistance wire located between said face and said lining, electrically-insulating heat-conducting material located between said wire and said face, and heat-insulating material located between said wire and said lining.

2. An electric resistance heating element comprising a pair of circular sheet metal sheath members spaced apart to define a hollow chamber and having their edges secured together, electric resistance material inside said chamber, a resistance wire carried by said resistance material, and terminal connections carried by one of said sheath members, one toward the center and the other adjacent the periphery thereof.

3. An electric resistance heating element of the character described comprising an outer metal shell frusto conical in form, an electric resistance heating element disposed within said shell, electrically insulating heat conducting material supported by said shell and embracing said heating element, an inner metal shell of frusto conical shape fitting within said outer shell and having its peripheral edge bent outwardly and secured to said outer shell, said outer shell having a peripheral flange thereon by means of which said heating element may be secured to a vessel.

4. An electric resistance heating element of the character described comprising an outer metal shell frusto conical in form, an electric resistance heating element disposed within said shell, electrically insulating heat conducting material supported by said shell and embracing said heating element, an inner metal shell of frusto conical shape fitting within said outer shell and having its peripheral edge bent outwardly and secured to said outer shell, said outer shell having a peripheral flange thereon by means of which said heating element may be secured to a vessel, and a layer of heat insulating material disposed between said mass of insulating material and said inner shell.

5. In a liquid heater, a liquid container formed of heat conducting material and having in one wall thereof an inwardly extending hollow boss shaped to provide an outwardly opening recess, an electrical resistance heating element disposed within said recess, said heating element being of substantially the same size and shape as said recess and including an electrical resistance wire having a covering thereon of electrically insulating heat conducting material, means securing said heating element within said recess so that the face thereof is disposed in intimate contact with the walls of said recess whereby the heat from the heating element will be rapidly transmitted to the liquid containing vessel by conduction, a layer of heat insulating material carried by said heating element and disposed at one side only thereof for decreasing the rate of transmission of heat away from the heating vessel, said heating element having a hollow portion and being externally tapered, and a heat responsive member located within the hollow portion of said heating element and connected in circuit therewith and accessible from the exterior thereof.

6. In a liquid heater, a liquid container formed of heat conducting material and having in one wall thereof an inwardly extending hollow boss providing an outwardly opening recess, the top of said boss being disposed below the normal liquid level in said container, an electrical resistance heating element fitting within said recess and including a resistance wire having a covering of refractory insulating heat conducting material and having a heat transmitting face complementary in shape to the adjacent surfaces of said boss and of substantially the same size as said recess, means urging said heating element into intimate contact with the walls of said recess whereby the heat transmitting face of the heating element will be presented in intimate contact with and in heat conducting relation to the wall of the container, said heating element having an interior hollow portion, a heat responsive member located within said hollow portion and in electrical circuit with the heating element and a layer of heat insulating material carried by said heating element and disposed between said heat responsive member and heating element.

7. In a liquid heater, a liquid container formed of heat conducting material and having in one wall thereof an inwardly extending hollow boss providing an outwardly opening recess, the top of said boss being disposed below the normal liquid level in said container, an electrical resistance heating element fitting within said recess and including a resistance wire having a covering of refractory insulating heat conducting material and having a heat transmitting face complementary in shape to the adjacent surfaces of said boss and of substantially the same size as said recess, means urging said heating element into intimate contact with the walls of said recess whereby the heat transmitting face of the heating element will be presented in intimate contact with and in heat conducting relation to the wall of the container, said heating element having an interior hollow portion, a heat responsive member located within said hollow portion and in electrical circuit with the heating element and a layer of heat insulating material carried by said heating element and disposed between said heat responsive member and heating element, a metal sheath embracing said heating element and having a portion thereon by means of which the heating element is secured in place.

In testimony whereof I hereunto affix my signature.

EDWIN L. WIEGAND.